US011569676B2

(12) United States Patent
Gaulke et al.

(10) Patent No.: US 11,569,676 B2
(45) Date of Patent: Jan. 31, 2023

(54) CHARGER WITH NANOCRYSTALLINE FERRITE CHOKE

(71) Applicant: MILWAUKEE ELECTRIC TOOL CORPORATION, Brookfield, WI (US)

(72) Inventors: David J. Gaulke, Milwaukee, WI (US); Kyle J. Radovich, West Bend, WI (US); Wyatt R. Silha, Milwaukee, WI (US); Chien-Chih Chao, Menomonee Falls, WI (US); Omid Shirazi, Wauwatosa, WI (US); Nathan J. Gustafson, Milwaukee, WI (US); Vasil Zhmendak, Milwaukee, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 85 days.

(21) Appl. No.: 17/084,830

(22) Filed: Oct. 30, 2020

(65) Prior Publication Data

US 2021/0159718 A1     May 27, 2021

Related U.S. Application Data

(60) Provisional application No. 62/939,747, filed on Nov. 25, 2019.

(51) Int. Cl.
*H02J 7/04*     (2006.01)
*H02J 7/00*     (2006.01)
(Continued)

(52) U.S. Cl.
CPC ............... *H02J 7/04* (2013.01); *H01F 17/06* (2013.01); *H02J 7/0013* (2013.01);
(Continued)

(58) Field of Classification Search
CPC ........................................................ H02J 7/00
See application file for complete search history.

(56) References Cited

U.S. PATENT DOCUMENTS

| 4,607,208 A | 8/1986 | Vreeland |
| 5,293,145 A | 3/1994 | Rynkiewicz |

(Continued)

FOREIGN PATENT DOCUMENTS

| CN | 2822122 Y | 9/2006 |
| CN | 202586785 U | 12/2012 |

(Continued)

OTHER PUBLICATIONS

International Search Report and Written Opinion for Application No. PCT/US2020/058102 dated Mar. 3, 2021 (9 pages).

(Continued)

*Primary Examiner* — Robert Grant
(74) *Attorney, Agent, or Firm* — Michael Best & Friedrich LLP

(57) ABSTRACT

A battery pack charging system includes a battery pack interface configured to receive a battery pack, a charging circuit coupled to the battery pack interface to provide charging current to the battery pack interface, and a controller coupled to the charging circuit and configured to control supply of charge current to the battery interface. The battery pack charging system further includes a power supply circuit coupled to the charging circuit, a filter circuit coupled to the power supply circuit and including a nanocrystalline ferrite common mode choke, and an alternating current plug configured to connect the filter circuit to an alternating current power source.

16 Claims, 10 Drawing Sheets

(51) Int. Cl.
   *H01F 17/06* (2006.01)
   *H01F 17/00* (2006.01)
(52) U.S. Cl.
   CPC .... *H02J 7/0042* (2013.01); *H01F 2017/0093* (2013.01); *H02J 2207/20* (2020.01)

(56) References Cited

U.S. PATENT DOCUMENTS

| | | | |
|---|---|---|---|
| 5,515,021 | A | 5/1996 | Rynkiewicz |
| 6,054,649 | A | 4/2000 | Uchida et al. |
| 6,977,484 | B1 | 12/2005 | Peng |
| 7,268,444 | B2 | 9/2007 | Enders et al. |
| 7,550,670 | B2 | 6/2009 | Kuo |
| 8,154,153 | B2 | 4/2012 | Yang et al. |
| 8,391,816 | B2 | 3/2013 | Yoshino et al. |
| 8,624,791 | B2 | 1/2014 | Payne et al. |
| 8,983,554 | B2 | 3/2015 | Mankaruse et al. |
| 9,325,049 | B2 | 4/2016 | Dai et al. |
| 9,815,421 | B2 | 11/2017 | Yamaguchi et al. |
| 9,934,888 | B2 | 4/2018 | Yoshino et al. |
| 10,366,826 | B2 | 7/2019 | Shiraki et al. |
| 2013/0049918 | A1 | 2/2013 | Fu et al. |
| 2013/0293437 | A1 | 11/2013 | Payne et al. |
| 2013/0322647 | A1 | 12/2013 | Kil |
| 2015/0061584 | A1 | 3/2015 | Okada et al. |
| 2015/0070102 | A1 | 3/2015 | Dai et al. |
| 2015/0303564 | A1 | 10/2015 | Payne et al. |
| 2017/0201092 | A1 | 7/2017 | Minato |
| 2018/0323624 | A1* | 11/2018 | Chang .................. H02J 7/0068 |
| 2019/0013630 | A1 | 1/2019 | Yoshino et al. |
| 2019/0029499 | A1 | 1/2019 | Petersen et al. |
| 2019/0245155 | A1* | 8/2019 | Heath ................. H01L 51/0076 |

FOREIGN PATENT DOCUMENTS

| | | |
|---|---|---|
| CN | 203387210 U | 1/2014 |
| CN | 205159713 U | 4/2016 |
| CN | 205544346 U | 8/2016 |
| CN | 207010527 U | 2/2018 |
| DE | 19716499 A1 | 10/1998 |
| EP | 2146413 B1 | 4/2015 |
| EP | 2770605 B1 | 2/2017 |
| EP | 1611658 B1 | 3/2017 |
| EP | 3176884 B1 | 5/2019 |

OTHER PUBLICATIONS

Szymon et al., "Attenuation of Nanocrystalline and Ferrite Common Mode Chokes for EMI Filters", Electronics, Jun. 2010, vol. 14, No. 1, pp. 88-92.

* cited by examiner

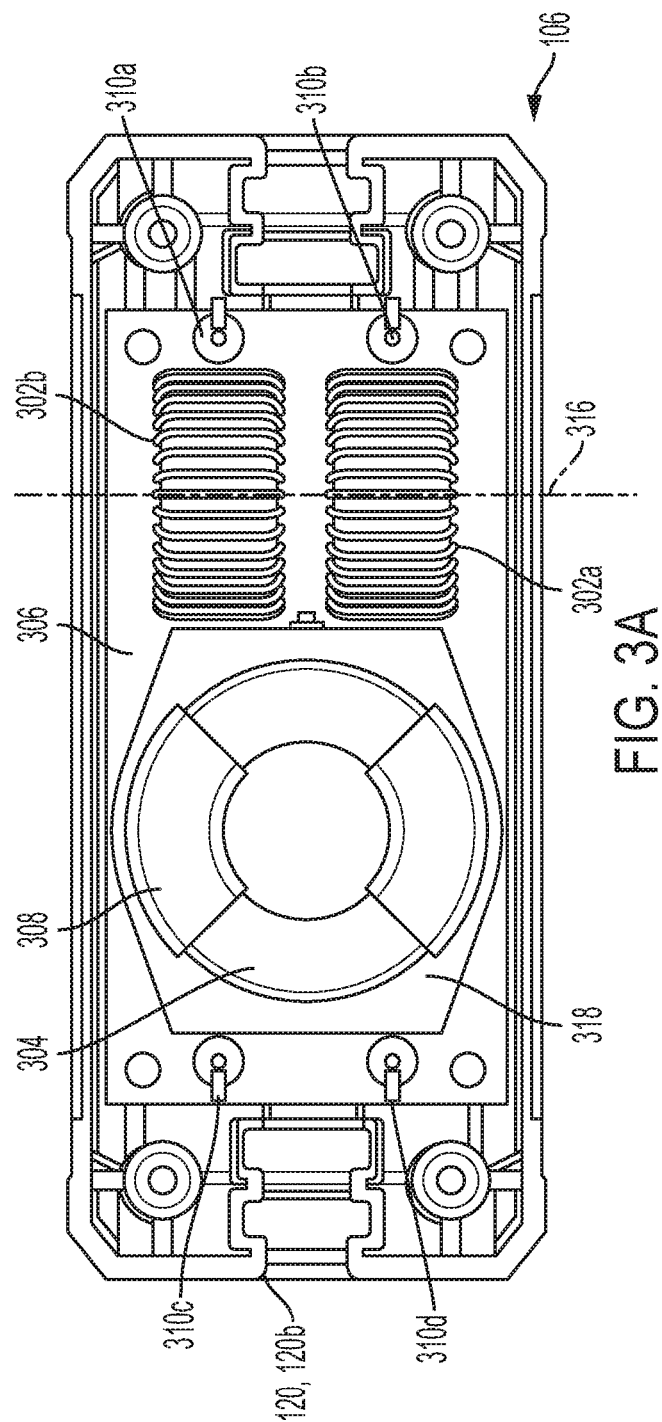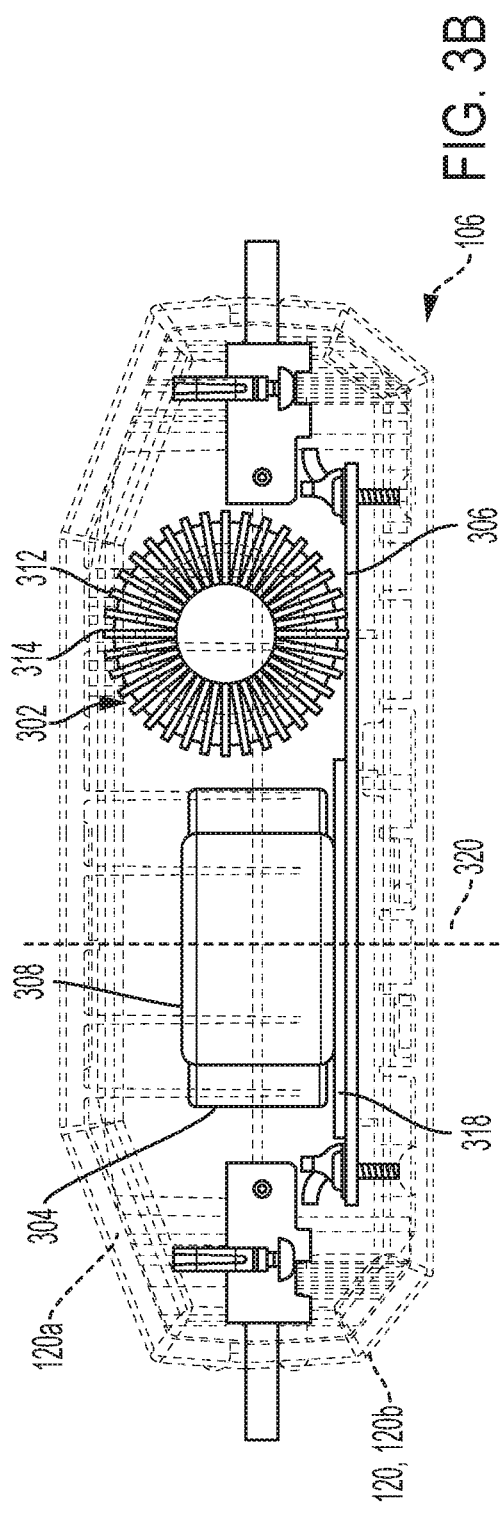

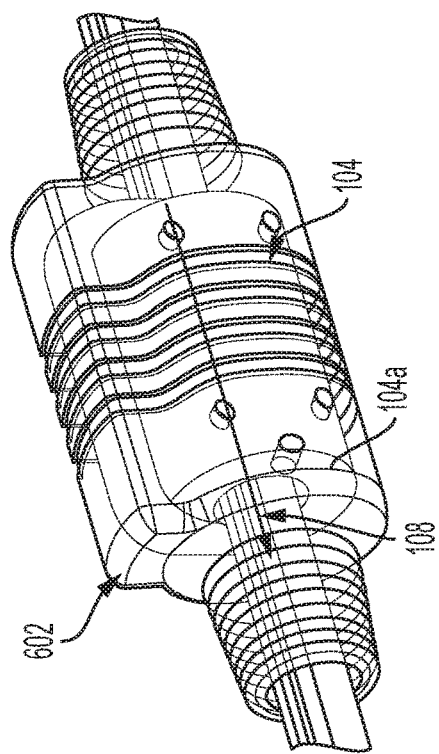
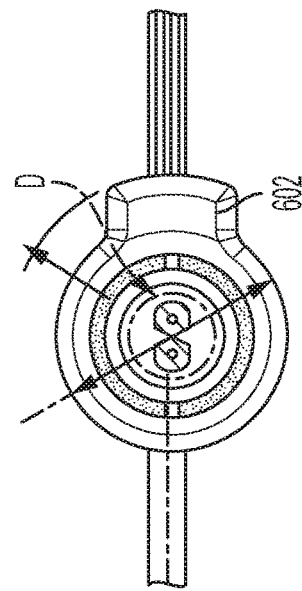
FIG. 6B
FIG. 6D
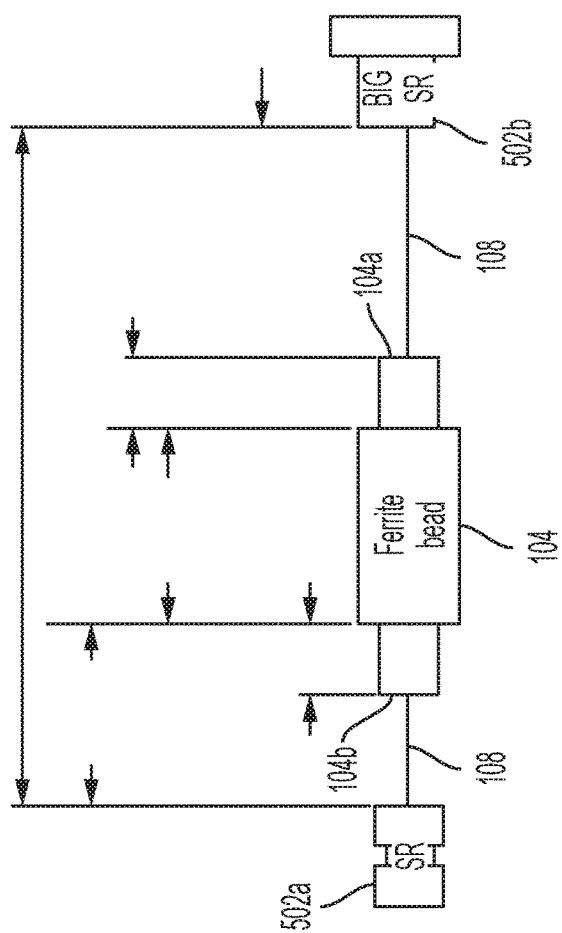
FIG. 6A
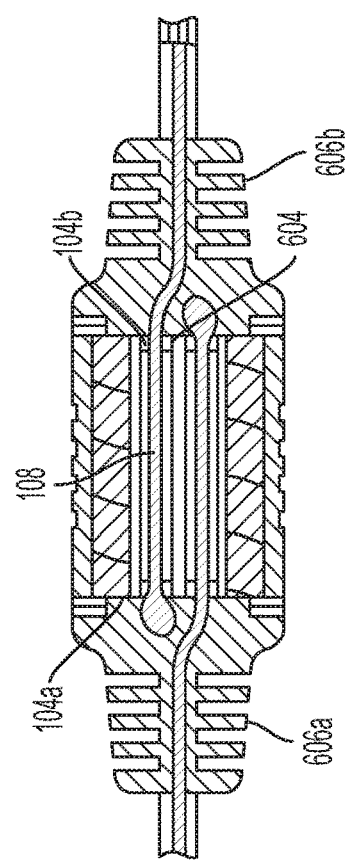
FIG. 6C

CHARGER WITH NANOCRYSTALLINE FERRITE CHOKE

RELATED APPLICATIONS

This application claims the benefit of U.S. Provisional Patent Application No. 62/939,747, filed Nov. 25, 2019, the entire content of which is hereby incorporated by reference.

FIELD

The present application relates to battery chargers and, more particularly, power tool battery chargers including filter elements.

SUMMARY

One embodiment of the invention provides a battery pack charging system. The battery pack charging system includes a battery interface configured to receive a battery pack and a charging circuit coupled to the battery interface and configured to provide a charging current to the battery interface. The battery pack charging system further includes a controller coupled to the charging circuit and configured to control supply of charge current to the battery interface, and a power supply circuit coupled to the charging circuit. The battery pack charging system further includes a filter circuit coupled to the power supply circuit and including a nanocrystalline ferrite common mode choke, and an alternating current plug configured to connect the filter circuit to an alternating current source.

In some embodiments, the filter circuit further includes at least one differential mode choke. In some embodiments, the filter circuit further includes a ferrite bead. In some embodiments, the system further includes a second nanocrystalline ferrite common mode choke. In some embodiments, the second nanocrystalline ferrite common mode choke is in series with the nanocrystalline ferrite common mode choke. In some embodiments, the nanocrystalline ferrite common mode choke is outside a charger housing, and the second nanocrystalline ferrite common mode choke is inside the charger housing. In some embodiments, the nanocrystalline ferrite common mode choke and the second nanocrystalline ferrite common mode choke are inside a charger housing. In some embodiments, the nanocrystalline ferrite common mode choke is of a toroidal shape. In some embodiments, the system further comprises a housing that houses the charging circuit, the controller, the power supply circuit, and the nanocrystalline ferrite common mode choke.

In some embodiments, the system further comprises a charger housing that houses the charging circuit, the controller, and the power supply circuit. The system further comprises a filter block housing that houses the nanocrystalline ferrite common mode choke. The system further comprises a power cable that connects the charger housing and the filter block housing. In some embodiments, the system further comprises a differential mode choke pair including a first and second differential mode choke, wherein the differential mode choke pair is part of the filter circuit. In some embodiments, the system further comprises a circuit board within the filter block housing, wherein the differential mode choke pair and the nanocrystalline ferrite common mode choke are positioned on the circuit board.

Another embodiment of the invention provides a battery pack charging system comprising a battery pack interface configured to receive a battery pack, and a charging circuit coupled to the battery pack interface and configured to provide charging current to the battery pack interface. The battery pack charging system further comprises a controller coupled to the charging circuit and configured to control supply of charge current to the battery pack interface. The battery pack charging system further comprises a power supply circuit coupled to the charging circuit, and a charger housing that houses the charging circuit, the controller, and the power supply circuit. The battery pack charging system further comprises an alternating current plug configured to connect to an alternating current source, and a filter circuit external to the charger housing and including a nanocrystalline ferrite filter element, the filter circuit configured to connect the power supply circuit to the alternating current plug to provide alternating current power to the power supply circuit.

In some embodiments, the system further comprises a second nanocrystalline ferrite filter element within the charger housing. In some embodiments, the second nanocrystalline ferrite filter element is in series with the nanocrystalline ferrite filter element. In some embodiments the filter circuit further comprises a differential mode choke pair including a first and second differential mode choke, and a ferrite bead. In some embodiments, the system further comprises a circuit board within the filter block housing, wherein the differential mode choke pair and the nanocrystalline ferrite common mode choke are positioned on the circuit board. In some embodiments, the system further comprises a ferrite bead positioned along the first power cable between the filter block housing and the charger housing. In some embodiments, the nanocrystalline ferrite filter element is a nanocrystalline ferrite common mode choke having a toroidal shape. In some embodiments, the system further comprises a second nanocrystalline ferrite filter element situated within the charger housing.

In some embodiments, the system further comprises a filter block housing that houses the filter circuit, a first power cable that connects the charger housing and the filter block housing, and a second power cable that connects the filter block housing to the AC plug. In some embodiments, the nanocrystalline ferrite filter element is a nanocrystalline ferrite common mode choke. In some embodiments, the filter circuit further includes a differential mode choke pair including a first and second differential mode choke, wherein the differential mode choke pair is part of the filter circuit.

Another embodiment of the invention provides a method for charging a battery pack. The method comprises receiving, by a battery pack interface of a battery pack charger, a battery pack, and receiving, via a power cable, alternating current power at a power supply of the battery pack charger. The method further comprises converting, by the power supply, the alternating current power to direct current power. The method further comprises controlling, by an electronic controller, a supply of charge current to the battery pack interface to charge the battery pack. The method further comprises receiving extraneous signals on the power cable, and filtering, by a nanocrystalline ferrite toroidal choke, the extraneous signals on the power cable.

In some embodiments, the nanocrystalline ferrite toroidal choke is a common mode choke. In some embodiments, the method further comprises filtering, by at least one differential mode choke, the extraneous signals on the power cable. In some embodiments, the method further comprises housing, by a filter block housing, the nanocrystalline ferrite toroidal choke and the at least one differential mode choke.

In some embodiments, filtering the extraneous signals on the power cable further includes filtering, via a first nanocrystalline ferrite toroidal choke configured to filter signals at a first frequency, the extraneous signals on the power cable, and filtering, via a second nanocrystalline toroidal choke configured to filter signals at a second frequency, the extraneous signals on the power cable. In some embodiments, receiving AC power at the power supply of the battery pack charger comprises receiving AC power at an AC plug, and providing the AC power from the AC plug to the power supply via the nanocrystalline ferrite toroidal choke and the at least one differential mode choke.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Use of "including" and "comprising" and variations thereof as used herein is meant to encompass the items listed thereafter and equivalents thereof as well as additional items. Use of "consisting of" and variations thereof as used herein is meant to encompass only the items listed thereafter and equivalents thereof.

Also, the functionality described herein as being performed by one component may be performed by multiple components in a distributed manner. Likewise, functionality performed by multiple components may be consolidated and performed by a single component. Similarly, a component described as performing particular functionality may also perform additional functionality not described herein. For example, a device or structure that is "configured" in a certain way is configured in at least that way but may also be configured in ways that are not listed.

Furthermore, some embodiments described herein may include one or more electronic processors configured to perform the described functionality by executing instructions stored in a non-transitory, computer-readable medium. Similarly, embodiments described herein may be implemented as a non-transitory, computer-readable medium storing instructions executable by one or more electronic processors to perform the described functionality. As used in the present application, "non-transitory computer-readable medium" comprises all computer-readable media but does not consist of a transitory, propagating signal. Accordingly, non-transitory computer-readable medium may include, for example, a hard disk, a CD-ROM, an optical storage device, a magnetic storage device, a ROM (Read Only Memory), a RAM (Random Access Memory), register memory, a processor cache, or any combination thereof.

Many of the modules and logical structures described are capable of being implemented in software executed by a microprocessor or a similar device or of being implemented in hardware using a variety of components including, for example, application specific integrated circuits ("ASICs"). Terms like "controller" and "module" may include or refer to both hardware and/or software. Capitalized terms conform to common practices and help correlate the description with the coding examples, equations, and/or drawings. However, no specific meaning is implied or should be inferred simply due to the use of capitalization. Thus, the claims should not be limited to the specific examples or terminology or to any specific hardware or software implementation or combination of software or hardware.

Other aspects of the invention will become apparent by consideration of the detailed description and accompanying drawings.

BRIEF DESCRIPTION OF THE DRAWINGS

FIG. 3A is a top view of a filtering block of the battery pack charging system, as shown in FIG. 1, with a top housing portion removed.

FIG. 3B is a side view of the filtering block, as shown in FIG. 3A.

FIG. 6A is a side view of a ferrite bead of the battery pack charging system as shown in FIG. 1.

FIG. 6B is a perspective view of the ferrite bead shown in FIG. 6A with an overmold in phantom.

FIG. 6C is a side cross-sectional view of the ferrite bead shown in FIG. 6A.

FIG. 6D is a front cross-sectional view of the ferrite bead shown in FIG. 6A.

DETAILED DESCRIPTION

Figure 1:
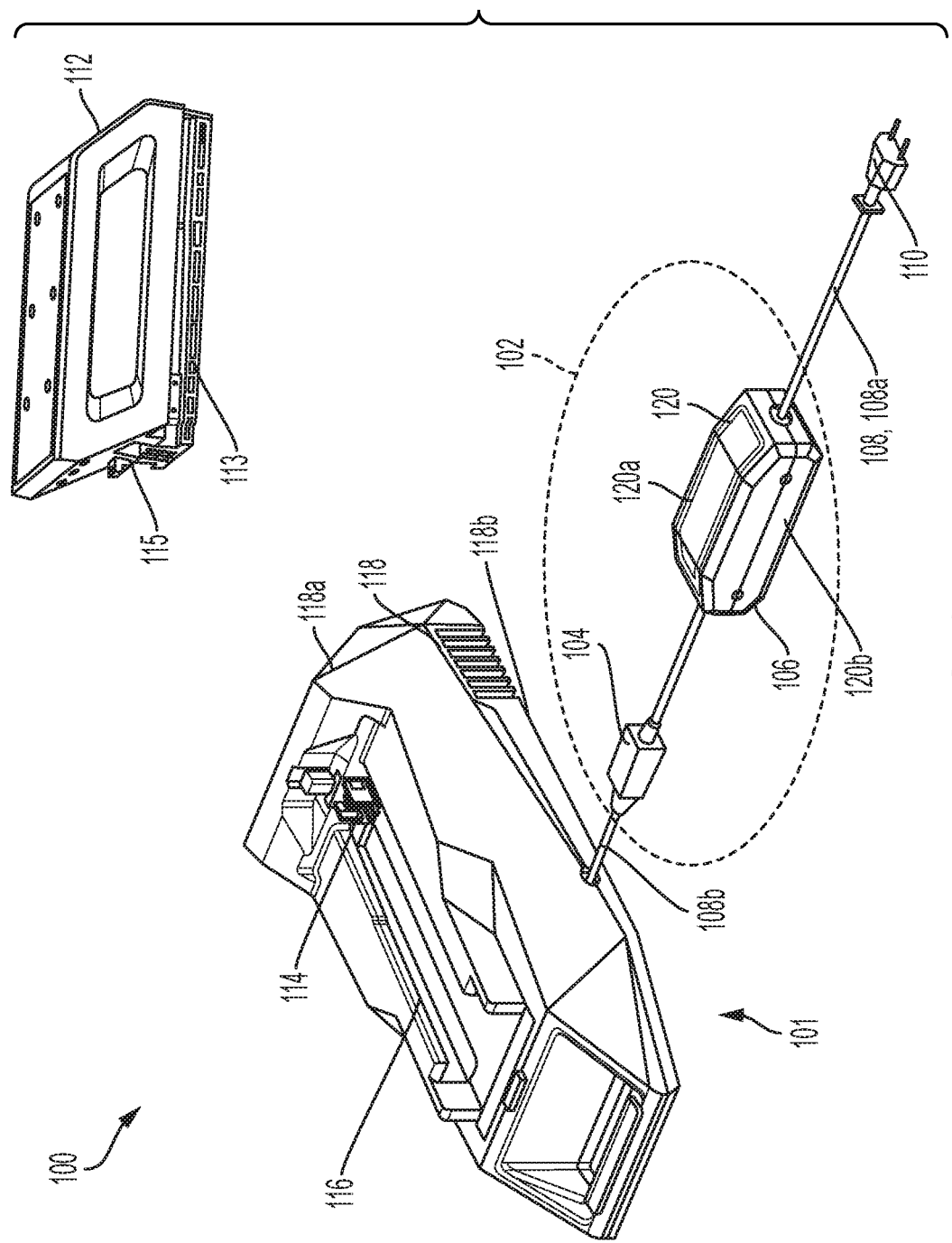
FIG. 1 shows one embodiment of a battery pack charging system.

FIG. 1 illustrates a battery pack charging system 100. The battery pack charging system 100 includes a battery pack charger 101, filtering circuitry 102, an alternating current (AC) power cable 108 including a first power cable portion 108a and a second power cable portion 108b, and an AC plug 110. While illustrated as a 2-wire cord having a power line and a neutral line (see FIG. 4), in some embodiments, the AC power cable 108 is a 3-wire cord having a power line, a neutral line, and a ground. The battery pack charger 101 has a battery pack charger housing 118 including a top housing portion 118a and a bottom housing portion 118b. The battery pack charger 101 is configured to receive AC power from an AC power source (e.g., a grid-connected wall outlet or AC generator) via the filtering circuitry 102 and AC plug 110, and to charge a battery pack 112. The battery charger 101 includes a physical battery pack interface 116 configured to receive and retain the power tool battery pack 112 (e.g., via rails 113 that slidingly engage the corresponding rails of the battery pack 112) and an electrical battery pack interface 114 (e.g., terminals) configured to engage corresponding electrical contacts 115 of the battery pack 112. In some embodiments, the battery charger 101 includes additional interfaces 114 and 116 such that it is configured to receive and charge multiple battery packs (e.g., receive and charge two battery packs simultaneously).

The battery pack 112 is configured to engage and power one or more power tools, such as various motorized power tools (e.g., a cut-off saw, a miter saw, a table saw, a core drill, an auger, a breaker, a demolition hammer, a compactor, a vibrator, a compressor, a drain cleaner, a welder, a cable tugger, a pump, etc.), outdoor tools (e.g., a chain saw, a string trimmer, a hedge trimmer, a blower, a lawn mower, etc.), other motorized devices (e.g., vehicles, utility carts, a material handling cart, etc.), and other non-motorized electrical devices (e.g., a power supply, a light, an AC/DC adapter, a generator, etc.). In some embodiments, the battery pack 112 is a high-power battery pack (e.g., having a nominal voltage of at least 80 volts [V]). In some embodiments, the battery pack 112 has a lower or higher nominal voltage (e.g., 12 volts, 18 volts, 28 volts, between 10-14 volts, between 16-24 volts, and the like.)

The filtering circuitry 102 further includes a ferrite bead 104 and a filtering block 106 coupled between the battery charger 101 and the AC plug 110 by the AC power cable 108. As illustrated, the second power cable portion 108b couples the filtering block 106 to the battery pack charger 101 and the first power cable portion 108a couples the filtering block 106 to the AC plug 110. Additionally, the ferrite bead 104 is positioned along the second power cable portion 108b. In some embodiments, the ferrite bead 104 is positioned along the first power cable portion 108a between the filtering block 106 and the AC plug 110. The filtering block 106 includes a filter block housing 120, also referred to as the block housing 120, which includes a top block housing portion 120a and a bottom block housing portion 120b (see FIGS. 3A-B).

Figure 2:
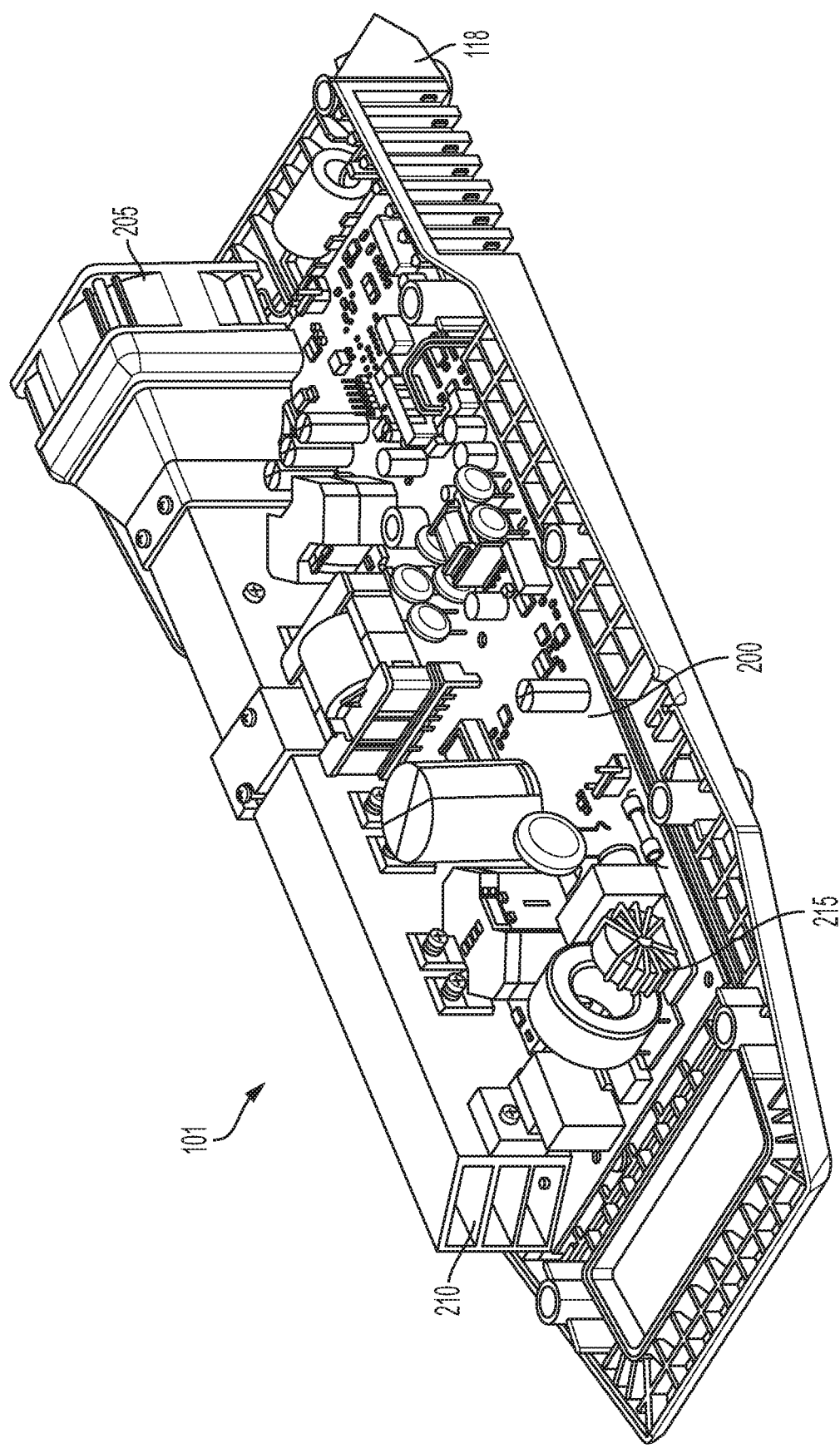
FIG. 2 is a perspective view of a battery pack charger of the battery pack charging system shown in FIG. 1.

FIG. 2 shows a perspective view of the battery pack charger 101 with the top housing portion 118a removed. The battery pack charger 101 includes a printed circuit board ("PCB") 200 within the battery pack charger housing 118. The PCB 200 includes various charger circuit elements mounted thereon and provides connections between these circuit elements. For example, the PCB 200 includes a controller, AC/DC power converter, power switching elements, among other circuit elements mounted thereon, which are described in further detail with respect to FIG. 4. Within the battery pack charger housing 118, also provided are a fan 205 and a heat sink 210 to provide a cooling airflow to cool the circuit elements. In other constructions, the PCB 200 may include additional electrical circuitry and/or components, such as, for example, additional microprocessors, transistors, diodes, current-limiting components, capacitors, etc. In some embodiments, the PCB 200 may include an internal choke 215, which, as illustrated, may be toroidal choke, and may include a nanocrystalline core. In some embodiments, the core of the internal choke 215 is constructed from a different material and, in some embodiments, the internal choke 215 has a different shape (e.g., with a rectangular cross-section, rather than circular).

Figure 3C:
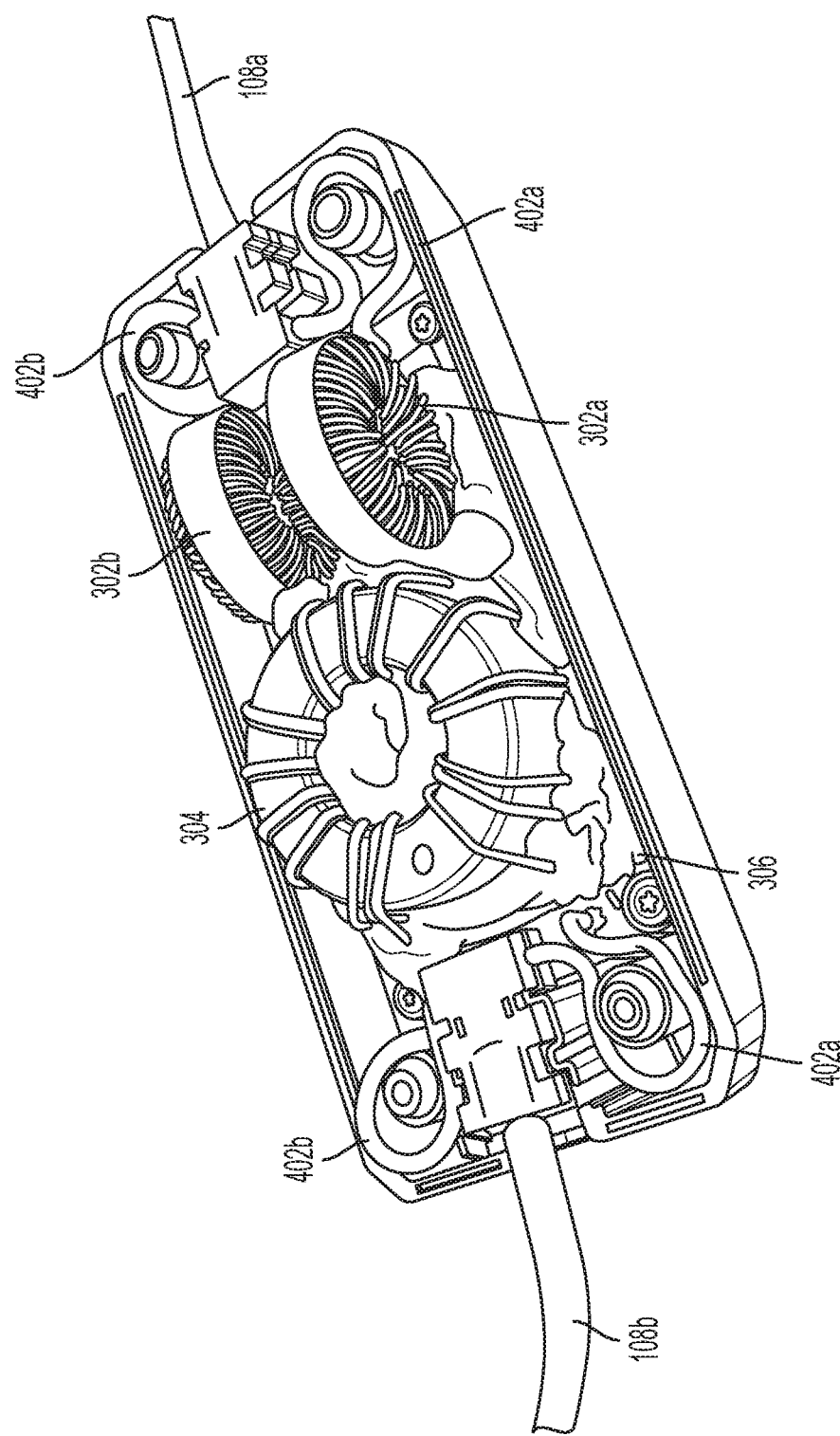
FIG. 3C is a top perspective view of the filtering block, as shown in FIG. 3A, with a top housing portion removed.

FIGS. 3A, 3B and 3C show the filtering block 106 with the top block housing portion 120a removed. The filtering block 106 includes filtering elements configured to filter extraneous AC signals (e.g., noise) from the battery pack charging system 100. The filter block housing 120 houses a differential mode choke pair 302, a nanocrystalline ferrite choke 304, and a second PCB 306, also referred to as a filter PCB 306. The differential mode choke pair 302 includes a first differential mode choke 302a and second differential mode choke 302b. Each of the first differential mode choke 302a, the second differential mode choke 302b, and the nanocrystalline ferrite choke 304 are mounted to the second PCB 306. Conductive traces of the second PCB 306 couple the differential mode choke pair 302, the nanocrystalline ferrite choke 304, and terminals 310a-d, with the particular connections therebetween illustrated in further detail in FIG. 4.

The differential mode chokes 302a and 302b are similarly sized, shaped, and constructed to one another. Each of the differential mode chokes 302a and 302b include a respective coil 312 of insulated wire wound on a toroidal magnetic core 314. One of the differential mode chokes 302a and 302b is coupled to a power supply line of the power cable 108 and the other differential mode chokes 302a and 302b is coupled to a neutral line of the power cable 108. The magnetic cores 314 and, thus, the overall shape of the differential mode chokes 302a and 302b, are toroidal as illustrated. The differential mode chokes 302a and 302b are positioned adjacent one another and coaxially with respect to an axis 316 passing through the center of the toroidal magnetic core 314 and parallel to the surface of the second PCB 306 on which the differential mode chokes 302a and 302b are mounted. The gap along the axis 316 between the differential mode chokes 302a and 302b is less than the width of the differential mode choke 302a and of the differential mode choke 302b taken individually. The differential mode chokes 302a and 302b generally pass common mode currents, while blocking differential currents (equal but opposite). In some embodiments, the magnetic cores 314 of the differential mode chokes 302a and 302b may also be composed of a nanocrystalline ferrite material.

The nanocrystalline ferrite choke 304 is a common mode choke having two insulated wires wound around a toroidal magnetic core, the first wound wire being connected to the power supply line of the power cable 108 the second wound wire being connected to the neutral line of the power cable 108. The first wound wire (power supply line) and the second wound wire (neutral line) are wrapped such that current present on both lines travels in the same direction. The first and second wound wire, and the nanocrystalline ferrite choke 304 itself, are secured by a clamp 308 to a choke support plate 318. The clamp 308 wraps over the wirings of the nanocrystalline ferrite choke 304 to restrict movement of the wirings. The choke support plate 318 is mounted to the second PCB 306. In the nanocrystalline ferrite choke 304, a magnetic field created by the wirings resists an increase in current created by extraneous signals (e.g., noise) on the lines. The nanocrystalline ferrite choke 304 generally passes differential currents (equal but opposite), while blocking common-mode currents.

The nanocrystalline ferrite choke 304 is composed of a nanocrystalline ferrite material. For example, the magnetic core is composed of a nanocrystalline soft magnetic alloy material, such as FeCuNbSiB. The crystallite of the ferrite may have a grain size of less than 100 nm. This material provides a high permeability and saturation magnetization due to the small size and high attenuation. Additionally, the nanocrystalline ferrite material provides a wider working temperature and flat temperature characteristics. For example, the nanocrystalline ferrite choke 304 may have a substantially constant permeability, attenuation, and magnetic induction regardless of temperature. Chokes including nanocrystalline ferrite material can be significantly smaller in size and weight when compared to non-nanocyrstalline ferrite counterparts. Additionally, fewer turns are needed due to less copper loss, and the high permeability and saturation result in a performance that can be more effective with improved operation margin.

The particular arrangement of the differential mode chokes 302a-b and the nanocrystalline choke 304 on the second PCB 306, along with their particular dimensions, enables the filtering block 106 to be compact. The differential mode chokes 302a and 302b are coupled vertically to the second PCB 306 such that the axis 316 extending through the center of the chokes 302a and 302b is parallel to the second PCB 306. The nanocrystalline ferrite choke 304 is coupled horizontally to the second PCB 306, such that an axis 320 extending through the center of the choke 304 is perpendicular to the second PCB 306. While the differential mode chokes 302a and 302b and nanocrystalline ferrite choke 304 are shown in a toroidal shape, they are not limited as such. The differential mode chokes 302a and 302b and the nanocrystalline ferrite choke 304 may also be formed in other shapes, for example, a flat rectangle.

The nanocrystalline ferrite choke 304 is generally larger than each individual differential mode choke 302a and 302b. For example, the radius of the nanocrystalline ferrite choke 304 (from the center point to the outer circumference) is larger than the radius of each individual differential mode choke 302a and 302b. Additionally, the combined width of the differential mode choke pair 302 along the axis 316, including the gap therebetween, is less than the diameter of the nanocrystalline ferrite choke 304. The thickness of the nanocrystalline ferrite choke 304 measured along the axis 320 is less than the height of each individual differential mode choke 302a and 302b measured in a direction parallel to the axis 320 (i.e., the height of the differential mode chokes 302a and 302b above the second PCB 306). The nanocrystalline ferrite choke 304 may also differ in winding construction. For example, the nanocrystalline ferrite choke 304 may be composed of a bifilar wiring configuration, while the differential mode chokes 302a and 302b may be composed of a sectional wiring. The nanocrystalline ferrite choke 304 may also be composed of a different type of wiring than the differential mode chokes 302a and 302b. For example, the nanocrystalline ferrite choke 304 may have a wire wrapping composed of magnet wire, while the differential mode choke 302a and 302b may have a wire wrapping composed of triple insulated wire. The nanocrystalline ferrite choke 304 and the differential mode chokes 302a and 302b are not restricted to these configurations, and may have another combination of these characteristics.

Figure 4:
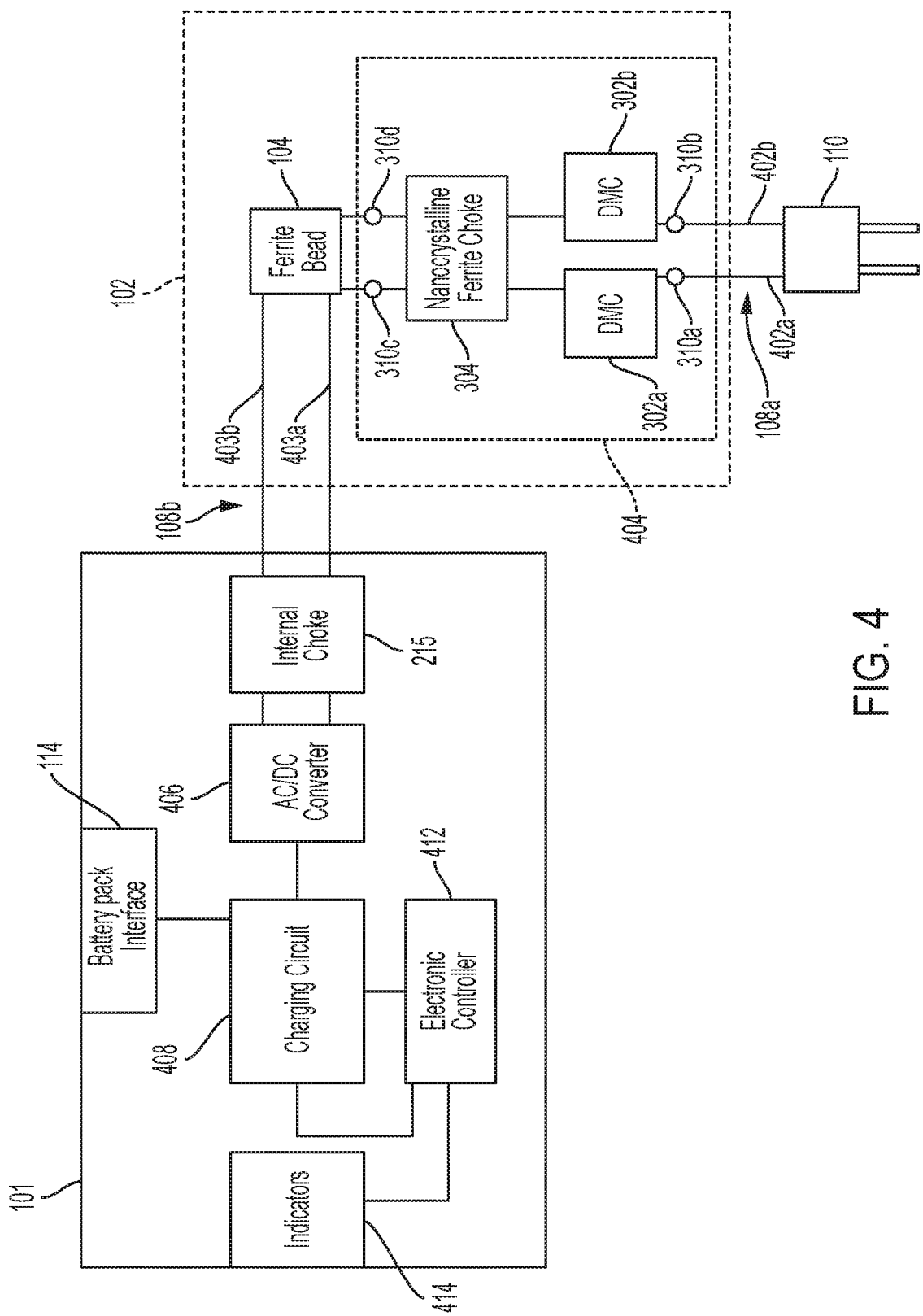
FIG. 4 is a block diagram of the battery pack charging system shown in FIG. 1.

As noted, the filtering block 106 further includes four terminals 310a, 310b, 310c, and 310d. Terminals 310a and 310b couple the filtering block 106 to the AC plug 110 via a power line 402a and a neutral line 402b of the first power cable portion 108a, as shown in FIG. 3C and FIG. 4. Terminals 310c and 310d couple the filtering block 106 to the ferrite bead 104 via a power line 403a and a neutral line 403b of the second power cable portion 108b, as shown in FIG. 3C and FIG. 4.

FIG. 4 is a block diagram of the battery pack charging system 100. The AC plug 110 is coupled to the filtering circuitry 102 by the first power cable portion 108a, which includes a power supply line 402a and a neutral line 402b. The power supply line 402a is coupled to the terminal 310a and the neutral line 402b is coupled to the terminal 310b. Via the first power cable portion 108a, the AC plug 110 provides AC power to the filtering circuitry 102, which includes the nanocrystalline ferrite choke 304, the differential mode chokes 302a and 302b, and the ferrite bead 104. The filter elements of the filtering circuitry 102 block extraneous signals and signals of undesired frequencies. Within the filtering circuitry 102, the nanocrystalline ferrite choke 304 and the differential mode chokes 302a and 302b form a secondary filtering circuit 404. The secondary filtering circuit 404 is housed within the filter block housing 120, as described above with respect to FIGS. 3A-B. In an alternative embodiment, the secondary filtering circuit 404 may be located within the battery charger housing 118, discussed in more detail below. The secondary filtering circuit 404 is also shown in the circuit diagram of FIG. 5.

As previously described with respect to FIGS. 3A-B, within the secondary filtering circuit 404, the power supply line 402a is coupled to the first differential mode choke 302a and the neutral line 402b is coupled to the second differential mode coke 302b. As described with respect to FIGS. 3A-B, the nanocrystalline ferrite choke 304 includes two wound wires. An output of the first differential mode choke 302a is coupled to a first of the wound wires of the nanocrystalline ferrite choke 304, and an output of the second differential mode choke 302b is coupled to a second of the wound wires of the nanocrystalline ferrite choke 304. The first and second wounds wires are then respectively coupled to the terminals 310c and 310d. These connections are also illustrated in the circuit diagram of FIG. 5.

The filtering circuitry 102 is connected by the second power cable portion 108b to the battery charger 101. More particularly, the second power cable portion 108b includes a power supply line 403a and a neutral line 403b that couple, respectively, to the terminals 310c and 310d at one end, and to an AC/DC converter 406 of the battery charger 101 at an opposite end. Additionally, as previously noted, the ferrite bead 104 is positioned along the second power cable portion 108b. The AC/DC converter 406, also referred to as a power supply circuit, converts the filtered AC power supplied through the ferrite bead 104 to DC power used to charge a battery pack (e.g., the battery pack 112) connected to a battery pack interface 114. The AC/DC converter 406 is, for example, a rectifier or switched-mode power supply. The AC/DC converter 406 also provides power to an electronic controller 412, although the circuit connection is not illustrated to simplify the drawing.

The DC power is supplied from the AC/DC converter 406 to the charging circuit 408. The charging circuit 408 is coupled to the battery pack interface 114 and is configured to provide charging current to the battery pack interface 114. The charging current is controlled by an electronic controller 412. For example, the charging circuit 408 may include one or more power switching elements (BJTs, MOSFETs, or the like) that are selectively controlled by the electronic controller 412 to provide charging current to the battery pack interface 114 and to inhibit charging current from flowing to the battery pack interface 114 (e.g., when the battery pack 112 is fully charged or no battery pack is present on the battery charger 101). The charging circuit 408 is also configured to provide battery status information regarding the battery pack 112 to the electronic controller 412, on which the electronic controller 412 bases its control of the charging circuit 408. For example, the electronic controller 412 is configured to control the charging circuit 408 to supply charging current to the battery pack interface 114 (and thus, the battery pack 112) until the electronic controller 412 determines that the battery pack 112 is fully charged (e.g., has a voltage level above a threshold stored on the electronic controller 412) or a fault condition is reached (e.g., an over-temperature signal is received from the battery pack 112 or the battery pack interface 114). In some embodiments, the charging circuit 408 includes sensors (e.g., current sensor, voltage sensor, temperature sensor, and the like) providing battery state information to the electronic controller 412. In some embodiments, in addition or instead of one or more sensors in the charging circuit 408, the battery pack 112 includes such sensors and a battery pack electronic controller that senses and communicates battery state information to the electronic controller 412 via the battery pack interface 114.

The electronic controller 412 determines from the sensors or from communication from the battery pack charging state of the battery pack 112 and other battery status information. Additionally, the electronic controller 412 determines status information for the battery charger 101 (e.g., charging, not charging, fault). The indicator 414 may be, for example, a light-emitting diode ("LED") display. The indicator 414 is located on the battery charger housing 118 to provide a user visual feedback. For example, the electronic controller 412 is configured to drive the indicator 414 to indicate a determined status of the battery pack 112, the battery charger 101, or a combination thereof.

In some embodiments, the electronic controller 412 includes a memory storing instructions and an electronic processor coupled to the memory and configured to retrieve and execute the instructions to implement the functionality of the electronic controller 412 described herein.

In some embodiments, the battery pack charger 101 may include an internal choke 215 configured to receive the second power cable portion 108b. The internal choke 215 is coupled to the power supply line 403a and the neutral line 403b on an input side of the choke 215, and the AC/DC converter 406 on an output side of the choke 215. The internal choke 215 may be a common mode toroidal choke with a ferrite core, nanocrystalline core, or another construction. The internal choke 215 may be configured to filter noise at a frequency different than the nanocrystalline ferrite choke 304 (e.g., based on a different core size, core material, number of winding turns, or winding wire type). In some embodiments, the internal choke 215 is not present and the power supply line 403a and neutral line 403b from the ferrite bead 104 are coupled to the AC/DC converter 406 without an intervening internal choke 215.

Figure 5:
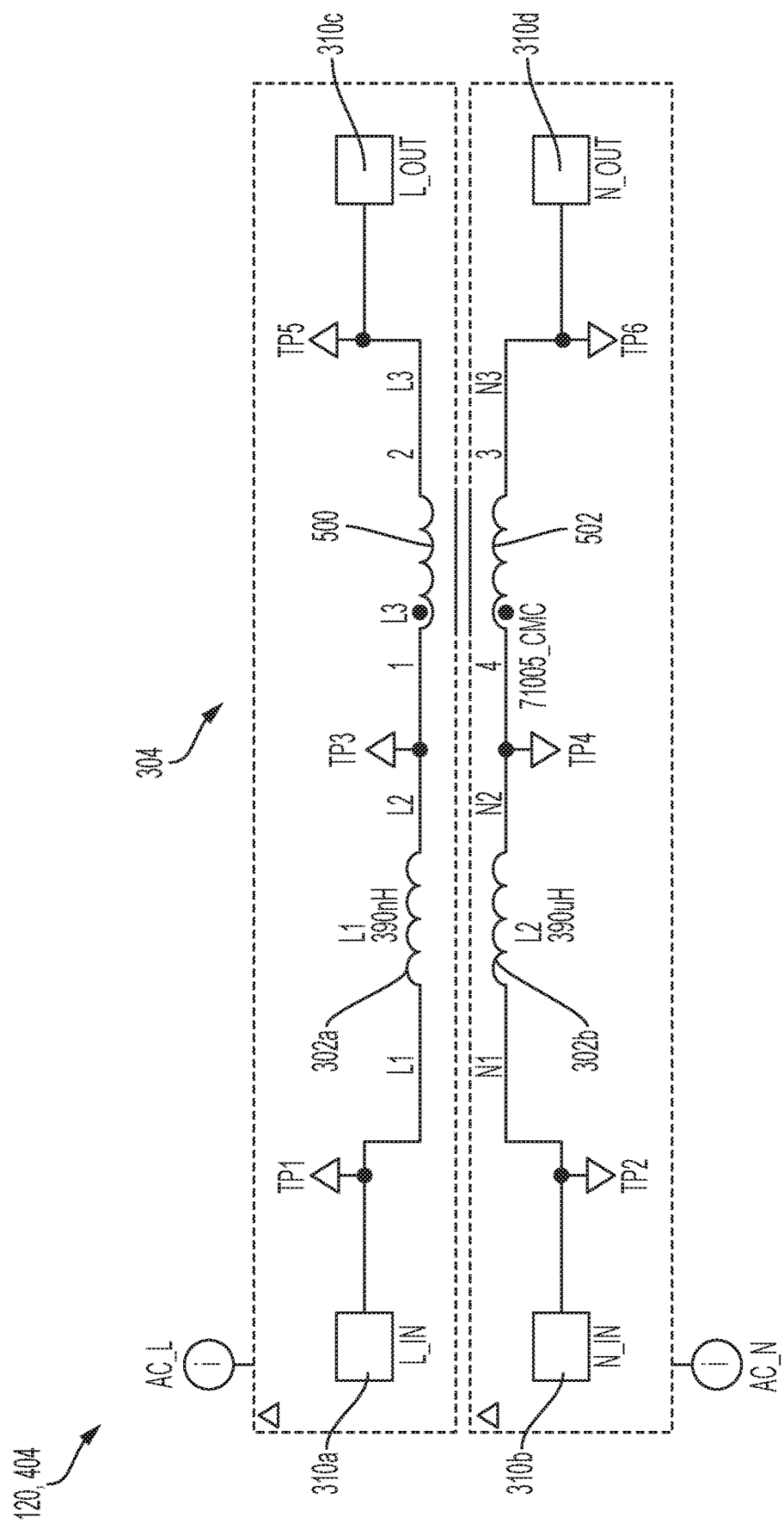
FIG. 5 is a circuit diagram of the filtering block as shown in FIG. 1.

FIG. 5 illustrates a circuit diagram of the filtering block 106 and the secondary filtering circuit 404 of FIG. 4. The diagram includes the previously discussed terminals 310a-d, differential mode chokes 302a and 302b, and the nanocrystalline ferrite choke 304. Also illustrated is the first wound wire (winding 500) and the second wound wire (winding 502) of the nanocrystalline ferrite choke 304 previously discussed above with respect to FIGS. 3A-B and 4.

FIGS. 6A-6D show various views of the ferrite bead 104. The ferrite bead 104 suppresses high-frequency noise by dissipating high-frequency current experienced by the AC power cable 108. The ferrite bead 104 is a hollow cylindrical shape with an input end 104a and output end 104b. The ferrite bead 104 is placed around the AC power cable 108, such that the AC power cable 108 extends from the input end 104a to the output end 104b through an inner passage of the ferrite bead 104. The second power cable portion 108b couples the ferrite bead 104 to the strain relief segments 502a and 502b. The strain relief segment 502a may be secured and connect to the battery pack charger 101. The strain relief segment 502b may be secured and connect to the filtering block 106. In some embodiments, the strain relief segment 502b may also be secured and connected to the AC plug 110. In one embodiment, the ferrite bead 104 is composed of a nanocrystalline ferrite material.

FIG. 6B shows an isometric view of the ferrite bead 104. The AC power cable 108 input end 104a of the ferrite bead 104, exits the output end 104b of the ferrite bead 104, wraps around the outer edge, and enters the input end 104a a second time, forming one complete loop around the surface of the ferrite bead 104. This arrangement is seen further in FIG. 6C, which provides a top view of the ferrite bead 104, and FIG. 6D, which provides a side view of the ferrite bead 104. The AC power cable 108 and the ferrite bead 104 are contained by a polymer overmold 602, such as polyvinyl chloride (PVC). Additionally, the overmold 602 includes a bead strain relief 606a and 606b.

Figure 7:
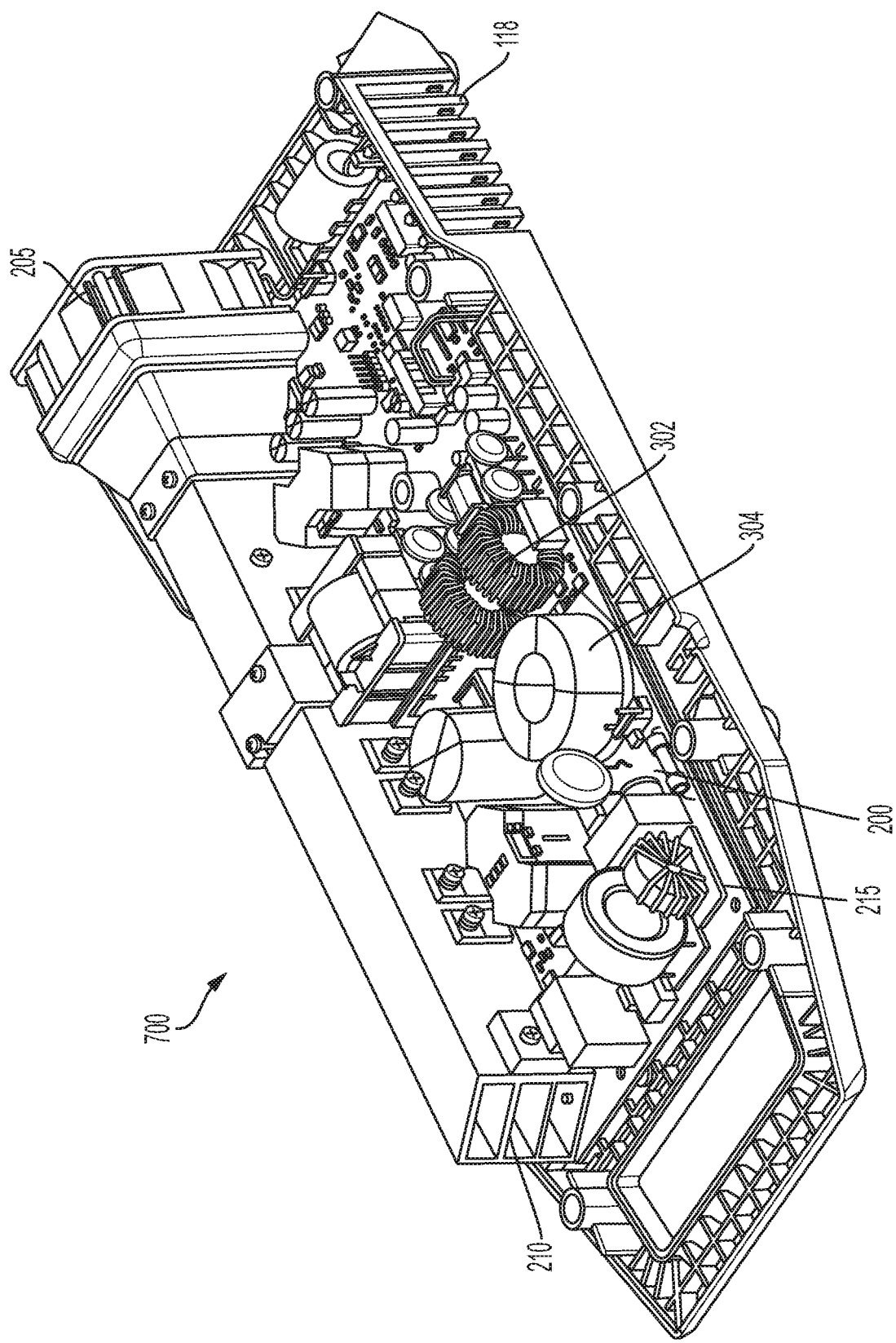
FIG. 7 shows a second embodiment of a battery pack charger of the battery pack charging system shown in FIG. 1.
Figure 8:
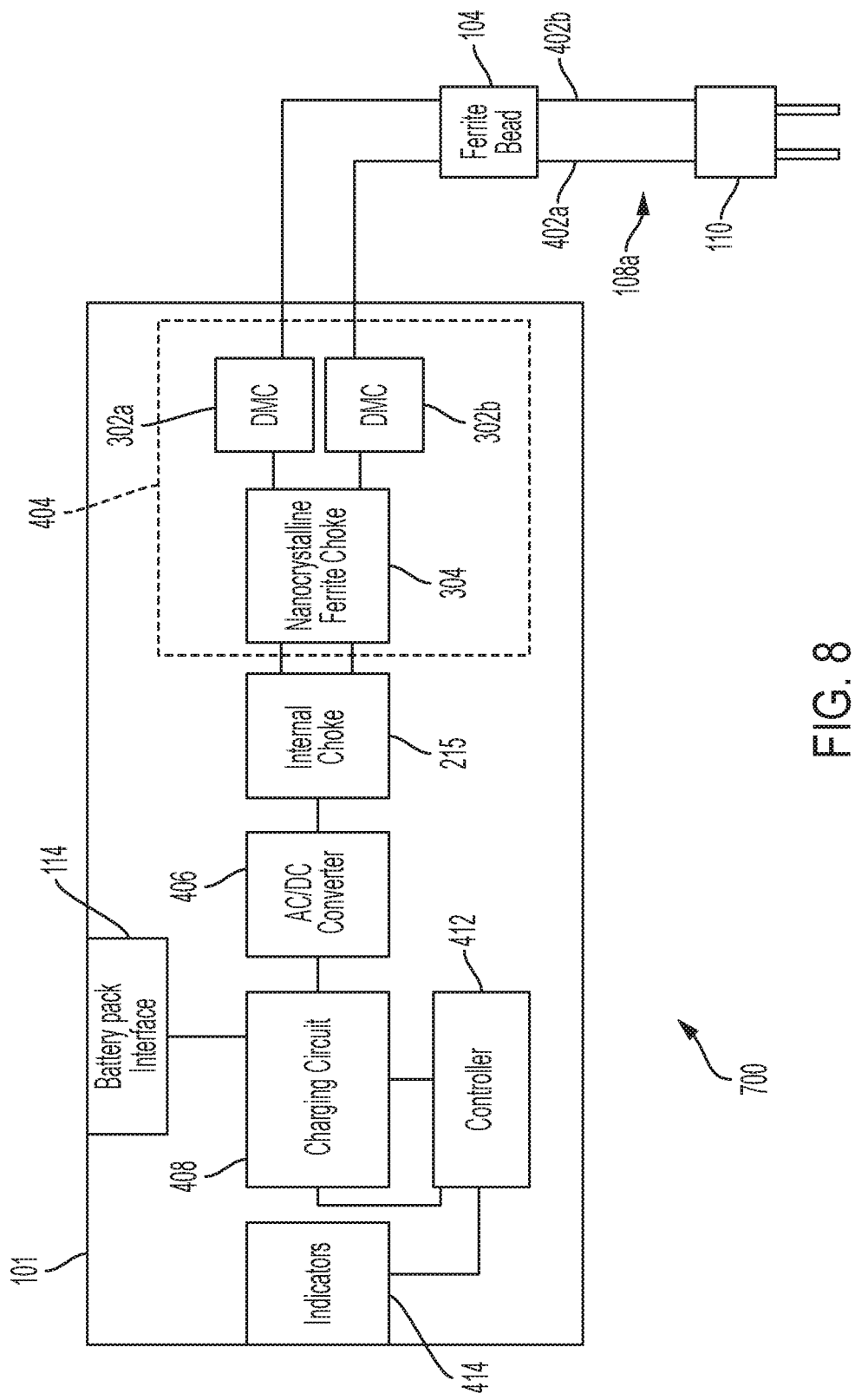
FIG. 8 is a block diagram of the battery pack charging system as shown in FIG. 7.

FIGS. 7-8 shows an alternative embodiment including a battery pack charger system 700. The battery pack charging system 700 of FIG. 7-8 is similar to the battery pack charging system 100 in several respects; accordingly, similar components are designated with similar reference numbers, and only the differences between the battery pack charger system 700 and the battery pack charging system 100 are discussed. In the embodiment, the nanocrystalline ferrite choke 304 and the differential mode choke pair 302 are positioned and housed within the battery pack charger housing 118. For example, as illustrated in FIG. 7, the nanocrystalline ferrite choke 304 and the differential mode choke pair 302 and mounted on the PCB 200.

FIG. 8 shows a block diagram of the alternative embodiment of the battery pack charging system 700. As noted, in the battery pack charging system 700, the secondary filtering circuit 404 is within the battery pack charger housing 118. In other words, this embodiment integrates the secondary filtering circuit 404 into the battery pack charger housing 118 and removes the filtering block 106 as a separate component having its own housing. Additionally, as similarly noted with respect to the embodiment illustrated in FIG. 4, in some embodiments, the internal choke 215 is not included in the battery pack charger system 700.

Figure 9:
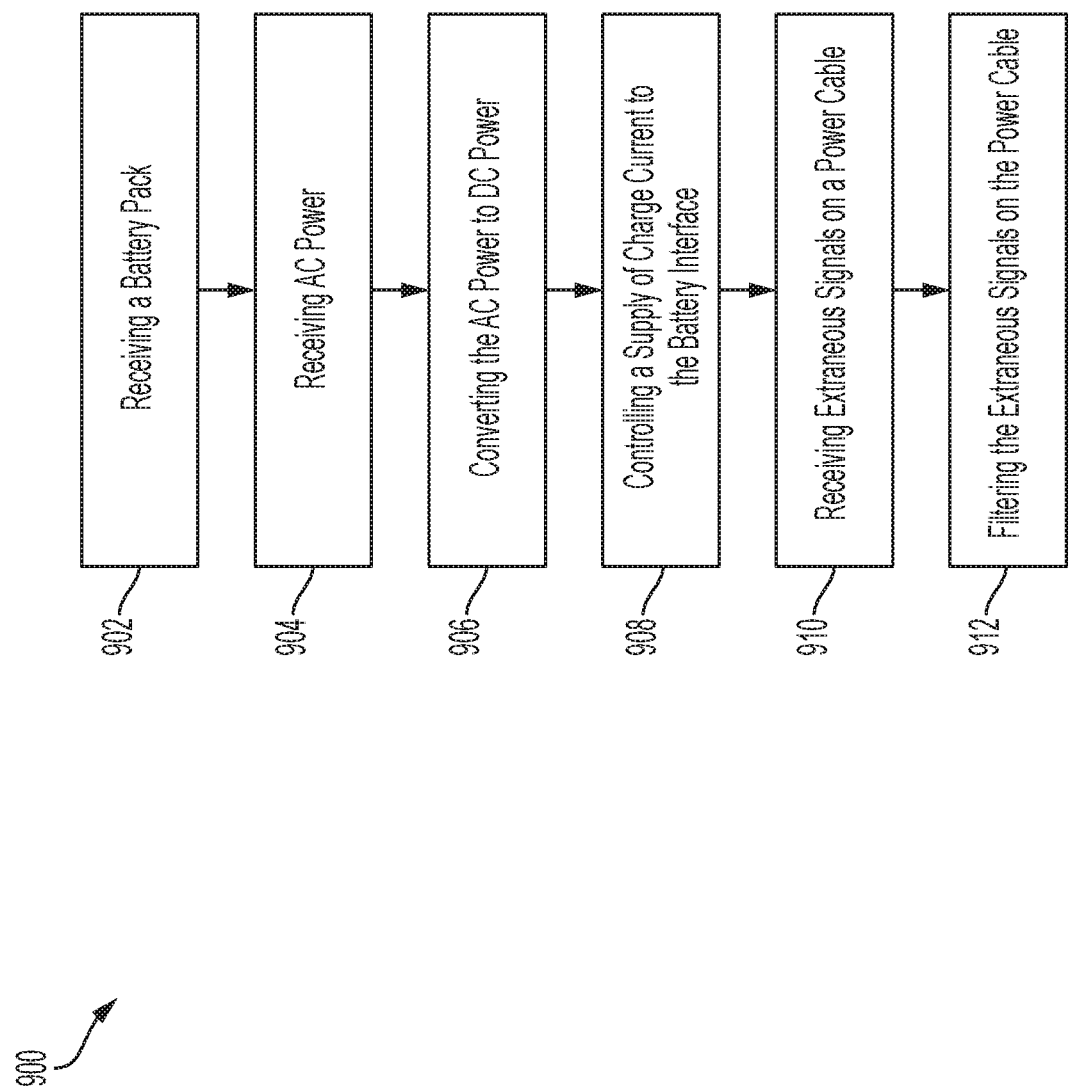
FIG. 9 is a flow chart of a method that may be implemented by the battery pack charging system of FIG. 1 or FIG. 7.

FIG. 9 shows a block diagram of a method 900 that, in some embodiments, is executed by the battery pack charging system 100 and the battery pack charging system 700. At block 902, the battery pack charging system 100 receives a battery pack 112 via the battery pack interface 114. For example, the rails of the physical battery pack interface 116 engage with corresponding rails 113 of the battery pack 112. Additionally, the terminals of the electrical battery pack interface 114 couple to corresponding electrical contacts 115 of the battery pack 112 to create an electrical connection.

At block 904, the battery pack charging system 100 receives AC power via the AC plug 110. The AC power may be provided by a residential electrical socket, a portable generator, or the like, to which the AC plug 110 is coupled.

At block 906, the battery pack charging system 100 converts the received AC power to DC power via the AC/DC converter 406. For example, in some embodiments, the AC/DC converter 406 includes a rectifier that receives and rectifies the AC power to DC power. Further, in some embodiments, the AC/DC converter 406 includes a switched mode power supply including power switching elements that receive AC power at an input side and are switched on and off via control signals (e.g., from the electronic controller 412) to generate DC power on an output side.

At block 908, the battery pack charging system 100, via the electronic controller 412, controls a supply of the charge current to the electrical battery pack interface 114. The supply of the charge current may be based on previous settings stored within a memory of the electronic controller 412 and on sensed battery pack information obtained by the electronic controller 412, as described above.

At block 910, the battery pack charging system 100 receives extraneous signals on the AC power cable 108. The extraneous signals may be, for example, electromagnetic interference or noise from internal circuit components (e.g., from controlling the power switching elements) or from external sources (e.g., other nearby electronic devices, or other power tools or appliances coupled to the same AC power supply) present when the current returns to the AC power cable 108. At block 912, the battery pack charging system 100 filters the extraneous signals on the power supply lines (such as AC power cable 108) via the nanocrystalline ferrite choke 304. For example, the wirings of the nanocrystalline ferrite choke 304 form a common mode configuration. The current traveling through the wirings creates a magnetic field that opposes change in the current traveling through the wirings, therefore filtering the extraneous signals. The extraneous signals may also be filtered by the differential mode chokes 302a and 302b, in conjunction with the nanocrystalline ferrite choke 304. In another construction, the ferrite bead 104 also filters the extraneous signals.

Thus, embodiments provided herein describe, among other things, systems and methods for filtering extraneous signals. Various features and advantages are set forth in the following claims.

What is claimed is:

1. A battery pack charging system comprising:
   a battery pack interface configured to receive a battery pack;
   a charging circuit coupled to the battery pack interface and configured to provide charging current to the battery pack interface;
   a controller coupled to the charging circuit and configured to control supply of charge current to the battery pack interface;
   a power supply circuit coupled to the charging circuit;
   a charger housing that houses the charging circuit, the controller, and the power supply circuit;
   a filter circuit coupled to the power supply circuit and including a nanocrystalline ferrite common mode choke;
   a filter block housing that houses the nanocrystalline ferrite common mode choke;
   a power cable that connects the charger housing and the filter block housing; and
   an alternating current plug configured to connect the filter circuit to an alternating current power source.

2. The battery pack charging system of claim 1, further comprising a second nanocrystalline ferrite common mode choke in series with the nanocrystalline ferrite common mode choke.

3. The battery pack charging system of claim 2, wherein the nanocrystalline ferrite common mode choke is outside a charger housing, and the second nanocrystalline ferrite common mode choke is inside the charger housing.

4. The battery pack charging system of claim 1, wherein the nanocrystalline ferrite common mode choke is of a toroidal shape.

5. The battery pack charging system of claim 1, further comprising a housing that houses the charging circuit, the controller, the power supply circuit, and the nanocrystalline ferrite common mode choke.

6. The battery pack charging system of claim 1, further comprising a differential mode choke pair including a first differential mode choke and a second differential mode choke, wherein the differential mode choke pair is part of the filter circuit.

7. A battery pack charging system comprising:
   a battery pack interface configured to receive a battery pack;
   a charging circuit coupled to the battery pack interface and configured to provide a charging current to the battery pack interface;
   a controller coupled to the charging circuit and configured to control supply of charge current to the battery pack interface;
   a power supply circuit coupled to the charging circuit;
   a charger housing that houses the charging circuit, the controller, and the power supply circuit;
   an alternating current plug configured to connect to an alternating current source;
   a filter circuit external to the charger housing and including a nanocrystalline ferrite filter element, the filter circuit configured to connect the power supply circuit to the alternating current plug to provide alternating current power to the power supply circuit;
   a filter block housing that houses the filter circuit;
   a first power cable that connects the charger housing and the filter block housing; and
   a second power cable that connects the filter block housing to the alternating current plug.

8. The battery pack charging system of claim 7, further comprising a second nanocrystalline ferrite filter element within the charger housing.

9. The battery pack charging system of claim 8, wherein the second nanocrystalline ferrite filter element is in series with the nanocrystalline ferrite filter element.

10. The battery pack charging system of claim 7, wherein the nanocrystalline ferrite filter element has a toroidal shape.

11. The battery pack charging system of claim 7, further including a differential mode choke pair including a first differential mode choke and a second differential mode choke, wherein the differential mode choke pair is part of the filter circuit.

12. A method for charging a battery pack, the method comprising:
   receiving, by a battery pack interface of a battery pack charger, a battery pack;
   receiving, via a power cable, alternating current power at a power supply of the battery pack charger;
   converting, by the power supply, the alternating current power to a direct current power;
   controlling, by an electronic controller, a supply of charge current to the battery pack interface to charge the battery pack;
   receiving extraneous signals on the power cable;
   filtering, by a nanocrystalline ferrite toroidal choke, the extraneous signals on the power cable; and
   housing, within a filter block housing separate from a charger housing, the nanocrystalline ferrite toroidal choke and the at least one differential mode choke.

13. The method of claim 12, wherein the nanocrystalline ferrite toroidal choke is a common mode choke.

14. The method of claim 12, further comprising:
   filtering, by at least one differential mode choke, the extraneous signals on the power cable.

15. The method of claim 12, wherein filtering the extraneous signals on the power cable includes:
   filtering, via a first nanocrystalline ferrite toroidal choke configured to filter signals at a first frequency, the extraneous signals on the power cable, and
   filtering, via a second nanocrystalline toroidal choke configured to filter signals at a second frequency, the extraneous signals on the power cable.

16. The method of claim 12, wherein receiving alternating current power at the power supply of the battery charger includes:
   receiving the alternating current power at an alternating current plug; and
   providing the alternating current power from the alternating current plug to the power supply via the nanocrystalline ferrite toroidal choke and at least one differential mode choke.

* * * * *